United States Patent
Matsubara et al.

[11] Patent Number: 6,076,945
[45] Date of Patent: Jun. 20, 2000

[54] COMPOSITE REFLECTOR AND EXTENSION MEMBER FOR USE IN A VEHICLE LAMP

[75] Inventors: Masao Matsubara; Kazuhito Mochizuki, both of Shizuoka, Japan

[73] Assignee: Koito Manufacturing Co., Ltd., Tokyo, Japan

[21] Appl. No.: 09/204,543

[22] Filed: Dec. 3, 1998

[30] Foreign Application Priority Data

Dec. 3, 1997 [JP] Japan ................................ 9-348557

[51] Int. Cl.⁷ .................................................. B60Q 1/04

[52] U.S. Cl. .................... 362/346; 362/517; 362/297; 362/507; 362/341

[58] Field of Search ........................... 362/487, 507, 362/516, 517, 519, 518, 543, 544, 296, 297, 341, 346

[56] References Cited

U.S. PATENT DOCUMENTS

| | | | |
|---|---|---|---|
| 4,569,007 | 2/1986 | Dick | 362/294 |
| 4,807,094 | 2/1989 | Mateos et al. | 362/80 |
| 5,003,446 | 3/1991 | Nagengast et al. | 362/294 |
| 5,172,972 | 12/1992 | Terao | 362/66 |
| 5,353,204 | 10/1994 | Kawamura | 362/61 |
| 5,394,310 | 2/1995 | Iwasaki | 362/61 |
| 5,611,612 | 3/1997 | Choji et al. | 362/61 |

*Primary Examiner*—Sandra O'Shea
*Assistant Examiner*—Ismael Negron
*Attorney, Agent, or Firm*—Morgan, Lewis & Bockius LLP

[57] ABSTRACT

A headlamp for a vehicle incorporating a composite reflector in which the composite reflector includes a pair of right and left reflectors. The right and left reflectors can be disposed close together or overlapped with each other as seen from a front view of the headlamp. An extension can be placed in a hollow portion between the right and left reflectors and connected to the right and left reflectors by a connecting member.

12 Claims, 7 Drawing Sheets

COMPOSITE REFLECTOR AND EXTENSION MEMBER FOR USE IN A VEHICLE LAMP

This application claims the benefit of Japanese patent application No. Hei 9-348557, filed on Dec. 3, 1997 which is hereby incorporated by reference.

BACKGROUND OF THE INVENTION

1. Field of Invention

The invention relates to a headlamp for a vehicle which incorporates a composite reflector. Further, the invention relates to a composite reflector that includes an extension member connected to the front of the composite reflector.

2. Discussion of Related Art

A conventional headlamp for a vehicle often employs an extension member which is disposed in the front of a reflector so as to surround a front opening of the reflector. The extension member has a shape so as not to interfere with the reflector when the reflector is being inclined to adjust the aim of the headlamp.

A four-lamp type headlamp incorporates a pair of reflectors, each reflector having a light source bulb joined thereto. Generally these pair of reflectors are disposed in parallel with each other in the lateral direction and set to be offset in a longitudinal direction. Moreover, in general, these two reflectors are integrally formed into a composite reflector housing. Examples of such headlamps are disclosed in U.S. Pat. Nos. 4,807,094 and 5,003,446 to Mateos et al. and Nagengast et al., respectively.

When attempting to provide the extension member for the headlamp for a vehicle which incorporates the above-mentioned type of composite reflector housing, various problems might occur depending on the positioning of the pair of reflectors that comprise the composite reflector housing. For example, the composite reflector housing has a connecting portion formed between the pair of reflectors. Therefore, the extension member has to be formed into a shape for preventing interference with the connecting portion.

In case where the front openings of the respective reflectors are disposed close together or overlapped with each other in a front view of the headlamp, if the extension member is provided and configured to avoid interference with the aforementioned connecting portion, the position of the opening periphery of the extension member that faces the front opening of the rear reflector has to be shifted from the original position to a position closer to the optical axis of the rear reflector. Therefore, the effective reflecting area of the rear reflector is reduced, resulting in deteriorated light distribution and reduced performance of the headlamp. Thus, the required design of the headlamp cannot be obtained as originally intended.

SUMMARY OF THE INVENTION

Accordingly, the present invention is directed to a vehicle lamp with composite reflector that substantially obviates one or more of the problems due to limitations and disadvantages of the related art.

In view of the foregoing, an object of the invention is to provide a headlamp for a vehicle having a composite reflector housing incorporated therein and structured such that interference between the composite reflector housing and the extension member can be prevented even if the front openings of a pair of right and left reflectors constituting the composite reflector housing are disposed close together or overlapped with each other. Thus, required effective reflecting areas of the reflectors can be maintained. Moreover, the degree of freedom for designing the headlamp can be improved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the vehicle lamp with composite reflector includes providing a hollow portion in a connecting portion between a pair of reflectors located in the composite reflector housing so as to achieve the aforementioned object.

In accordance with an aspect of the invention, a headlamp for a vehicle includes, a composite reflector having a front portion and a rear portion and including a pair of reflectors each having a front opening, being integrally formed with each other, and offset in a longitudinal direction, an extension member disposed in the front portion of said reflector for surrounding said front opening of each of said reflectors, wherein said front openings of said reflectors are disposed adjacent each other as seen in a front view of said headlamp, and a connecting member including a hollow portion formed between said reflectors of said composite reflector housing to penetrate therethrough.

The shape and size of the "hollow portion" formed in the connecting portion is not limited as long as the opening periphery of the extension that faces the front opening of the rear reflector is permitted to be closer to the connecting portion as compared with a structure having no hollow portion.

As described above, the headlamp for a vehicle according to the invention is provided with a composite reflector housing formed of a pair of right and left reflectors which are longitudinally offset. The front openings of the reflectors are disposed close together or overlapped with each other in a front view of the headlamp. Therefore, the connecting portion defined by the two reflectors of the composite reflector housing forms a vertical wall extending substantially in a longitudinal direction. The hollow portion that penetrates the connecting portion is formed therein. Therefore, in the case where the extension is disposed to surround the front opening of each reflector in the front of the composite reflector housing, interference between the connecting portion of the composite reflector housing and the extension member can be prevented even if the composite reflector housing is inclined by the aiming adjustment. As a result, the extension member can be formed into a shape that satisfies the intended lamp design.

Therefore, even where the headlamp for a vehicle that incorporates a composite reflector housing with a pair of reflectors that are disposed close together or overlapped with each other, interference between the composite reflector housing and the extension member can be formed into a shape that satisfies the intended lamp design.

The headlamp of a vehicle may be formed such that reinforcing ribs are formed in an area adjacent the portion in the connecting portion. Thus, a decrease in the rigidity of the connecting portion resulting from formation of the hollow portion can be prevented or minimized.

In order to maintain the rigidity of the connecting portion, it is preferable to round the outline of the hollow portion.

The hollow portion makes it possible to locate the opening periphery of the extension member that faces the front opening of the rear reflector to a position closer to the connecting portion as compared with a structure having no hollow portion. In accordance with another respect of the invention, the hollow portion can be disposed to stereoscopically intersect the composite reflector housing. As a result, the effective reflecting area of the rear reflector can easily be maintained. Moreover, a novel design of the headlamp can be employed.

The shape of the opening peripheries of the extension member that faces the front opening of each reflector is not particularly limited. The shape may be the same as, or different from that of the front opening of each reflector. In accordance with the another respect of the invention, an opening periphery of the extension member that faces the front opening of the reflectors in the vicinity of the connecting portion is formed in a circular arc shape.

In many cases, in order to obtain the largest possible effective reflecting area of each reflector the shape of the front opening of each reflector cannot be formed into single curve. When shaping the "opening periphery" into the same shape as that of the front opening in the aforementioned case, the design of the portion between both reflectors become very complicated. When each "opening periphery" is formed into the circular arc shape, the portion between both reflectors can be designed into a simple, well-trimmed form.

The extension member may be formed as a single member, and in accordance with another respect of the invention, may be structured such that the extension member has the main body and a pair of ring members to be joined to the main body of the extension member for forming the opening periphery for each reflector.

In most cases, the molding process can be made easier by laterally inclining the direction in which the mold for molding the extension is drawn with respect to the longitudinal direction. On the other hand, it is preferable in view of the headlamp design to form each opening periphery to face longitudinally. Such contradicting requirements can be satisfied if the extension member is formed of a main body and a pair of ring members. Moreover, color and surface treatment applied to the main body and the respective ring members may be varied. As a result, the degree of design freedom of the headlamp can be further improved.

Each "ring member" may be a complete ring member that forms a circle or an incomplete ring member that forms a circle or an incomplete ring member that partially forms a cut portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
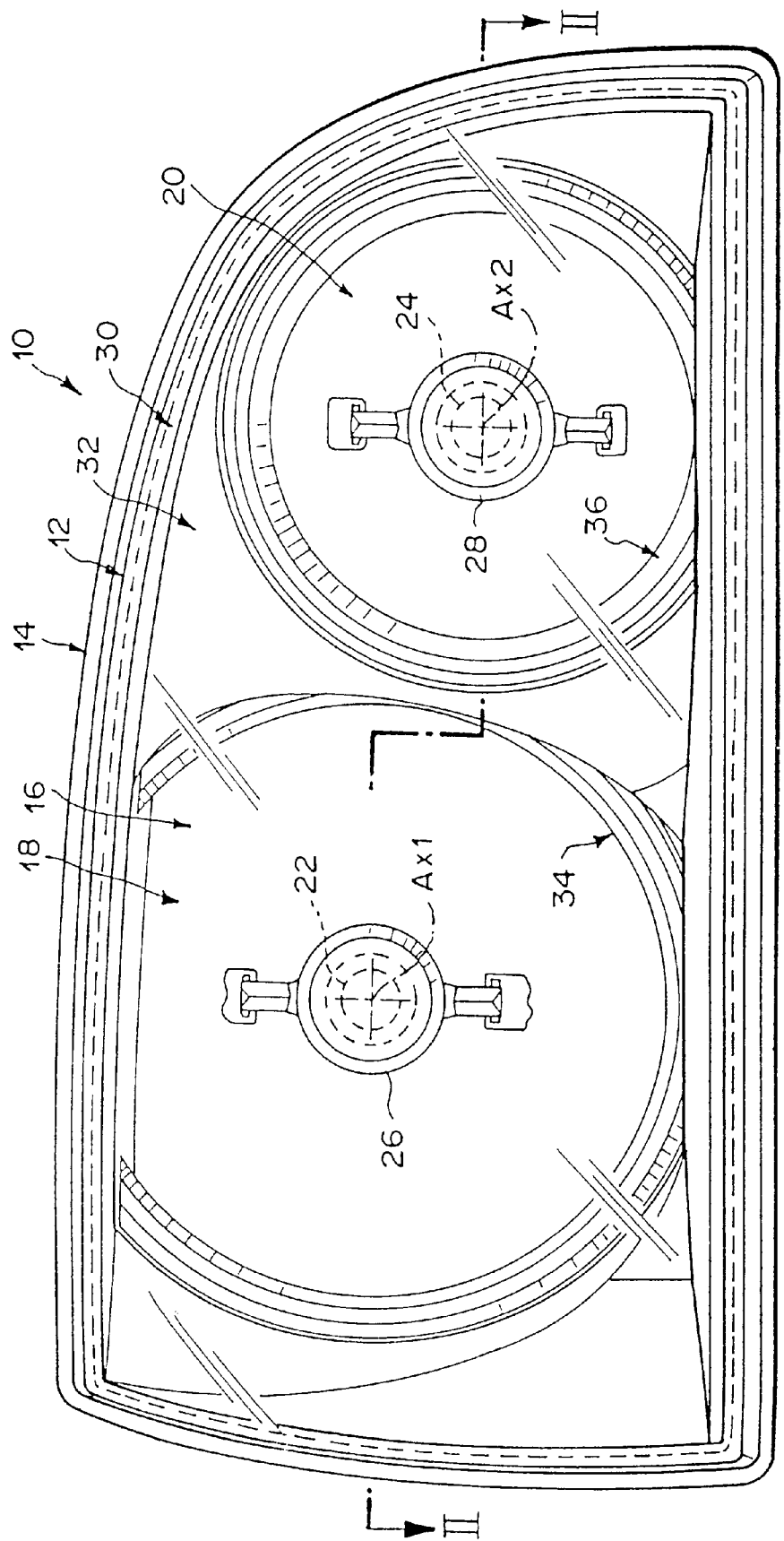
FIG. 1 is a front view of a headlamp for a vehicle embodying the principles invention.

An illustrated embodiment of the present invention will now be described involving an irradiation angle adjusting mechanism of a headlamp for an automobile. As seen, for example, in FIG. 1, a lamp, such as a headlamp 10 for a vehicle is a right-side lamp unit of a four-lamp-type headlamp. The headlamp 10 incorporates a composite reflector 16 which is vertically and horizontally inclinable and disposed in a space defined by lens 12 and a lamp body 14.

The composite reflector 16 is a resin product obtained through injection molding and is formed of a pair of right and left reflectors 18 and 20 integrally formed with each other. Light source bulbs 22, 24 and shades 26, 28 are joined to the corresponding reflectors 18, 20. The reflectors 18, 20 are disposed such that the reflector 18 with respect to the width of the vehicle body is offset to the rear of the reflector 20 with respect to the width of the vehicle body. Front openings 18a, 20a (FIG. 2) of the reflectors 18, 20 are disposed close together in a front view of the head lamp.

The light source bulbs 22, 24 and shades 26, 28 are mounted to the corresponding reflectors 18, 20 respectively. The lens 12 is a clear lens and gives each of the reflectors 18, 20 the distribution controlling function.

An extension member 30 is disposed in the vicinity of the fore of the composite reflector 16 so as to surround front openings 18a, 20a of the reflectors 18, 20. The extension member 30 is formed of a main body 32 and a pair of ring members 34, 36 joined to the main body 32. Each of the ring members 34, 36 constitutes an opening periphery that faces the front openings 18a, 20a of the respective reflectors.

Figure 3:
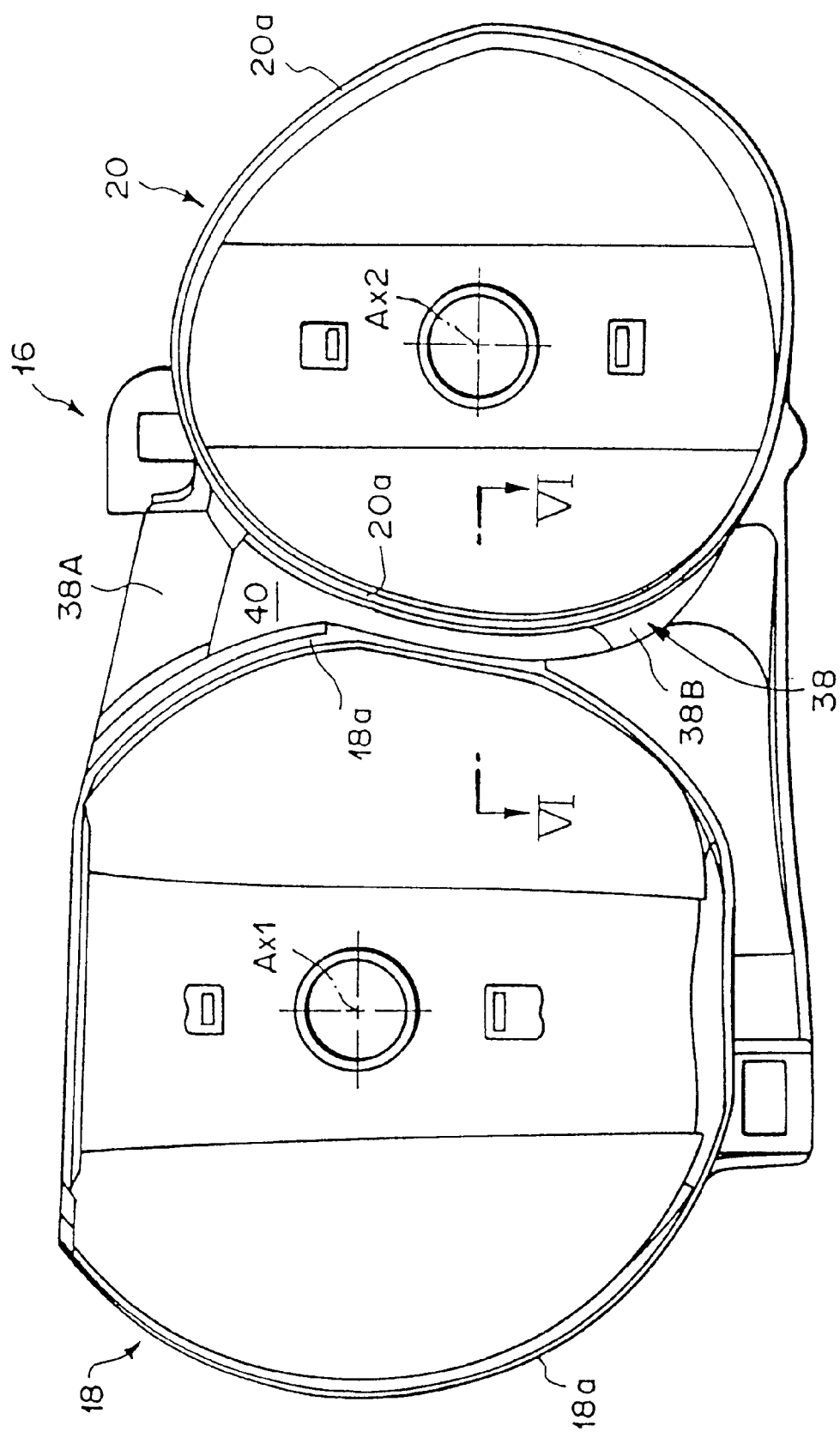
FIG. 3 is a front view of a composite reflector embodying the principles of the invention.
Figure 4:
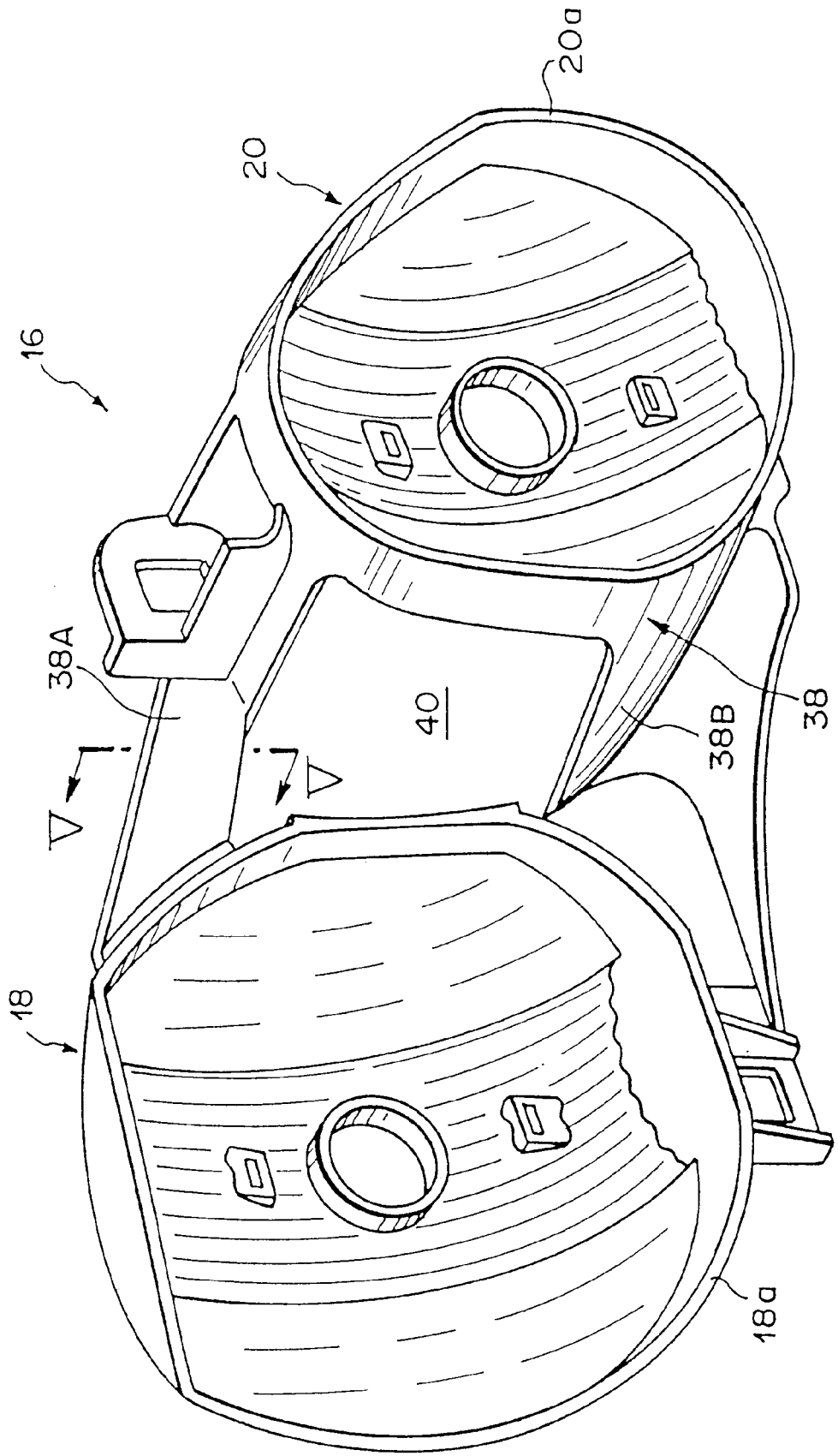
FIG. 4 is a perspective view of the composite reflector shown in FIG. 3.

As shown in FIGS. 3 and 4, the composite reflector 16 has connecting portion 38 disposed between the pair of right and left reflectors 18, 20 for the connection therebetween. The connecting portion 38 is formed as a vertical wall extending in substantially a longitudinal direction. The connecting portion 38 has a hollow portion 40 that penetrates therethrough. The hollow portion 40 is formed into substantially a rectangular shape in a side view of the headlamp. In the front view of the headlamp, the hollow portion 40 has a substantially circular arc shape extending along the front opening 20a of the reflector 20. Moreover, the width of the hollow portion is gradually increased toward the top end thereof. The connecting portion 38 is divided into an upper connecting portion 38A and a lower connecting portion 38B by the hollow portion 40 formed therein.

Figure 5:
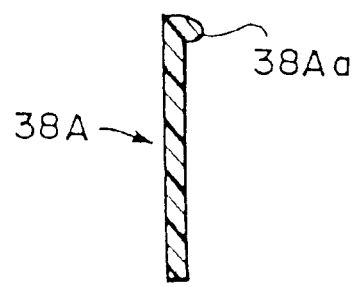
FIG. 5 is a sectional view taken along line V—V of FIG. 4.

As shown in FIG. 5, a reinforcing rib 38Aa extending in substantially longitudinal direction is formed at the top end of a flat portion of the upper connecting portion 38A. The upper connecting portion 38A is reinforced by the reinforcing 38Aa.

Figure 6:
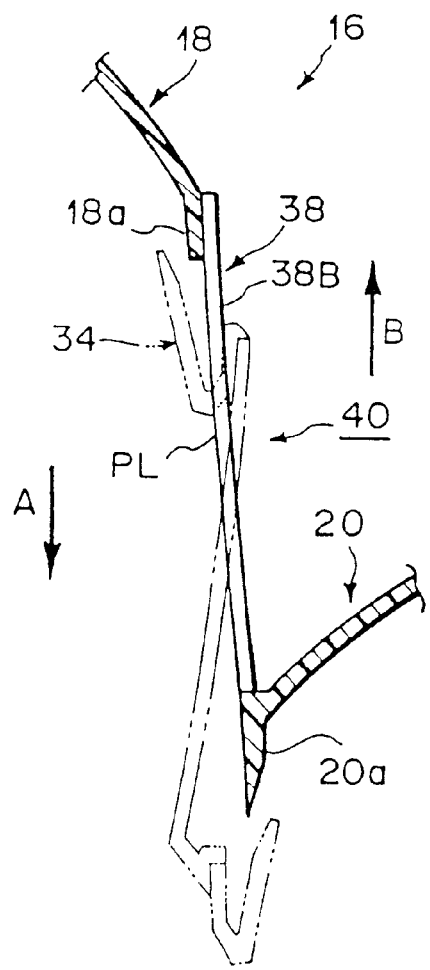
FIG. 6 is a cross sectional view taken along line VI—VI of FIG. 3.

As shown in FIG. 6, a mold for molding the composite reflector 16 forms a mold parting surface PL in the hollow portion 40. The mold is a "land mold" for forming the hollow portion 40 by opening the mold in a longitudinal direction (in directions A and B in the drawing). In the embodiment shown in FIG. 6, the mold is structured such that a corner R is formed at each of the upper and lower corners at the front end of the hollow portion 40 in the connecting portion 38. As a result, rigidity of the connecting portion 38 can be enhanced.

Figure 2:
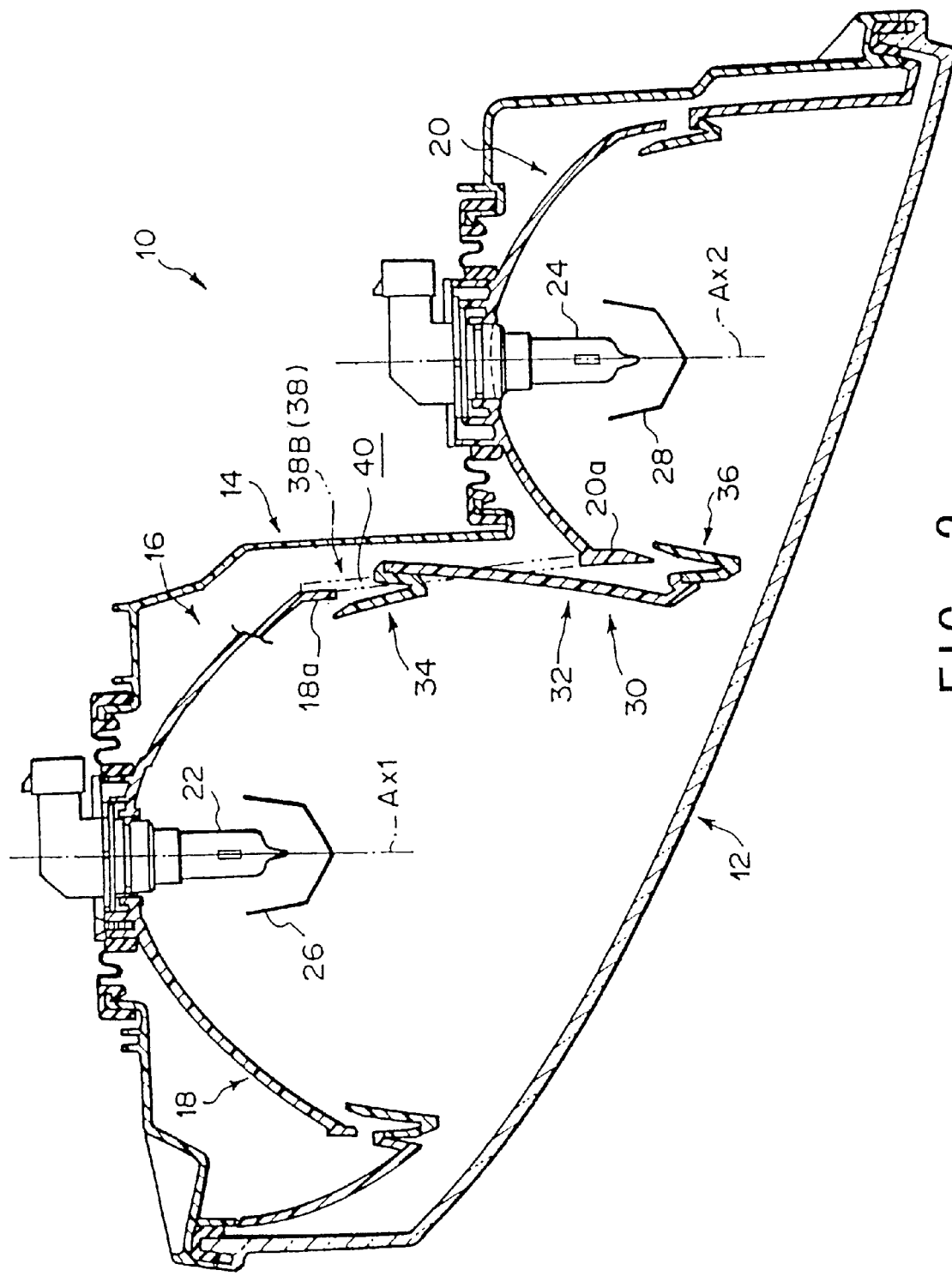
FIG. 2 is a sectional view taken along the line II—II of FIG. 1.
Figure 7:
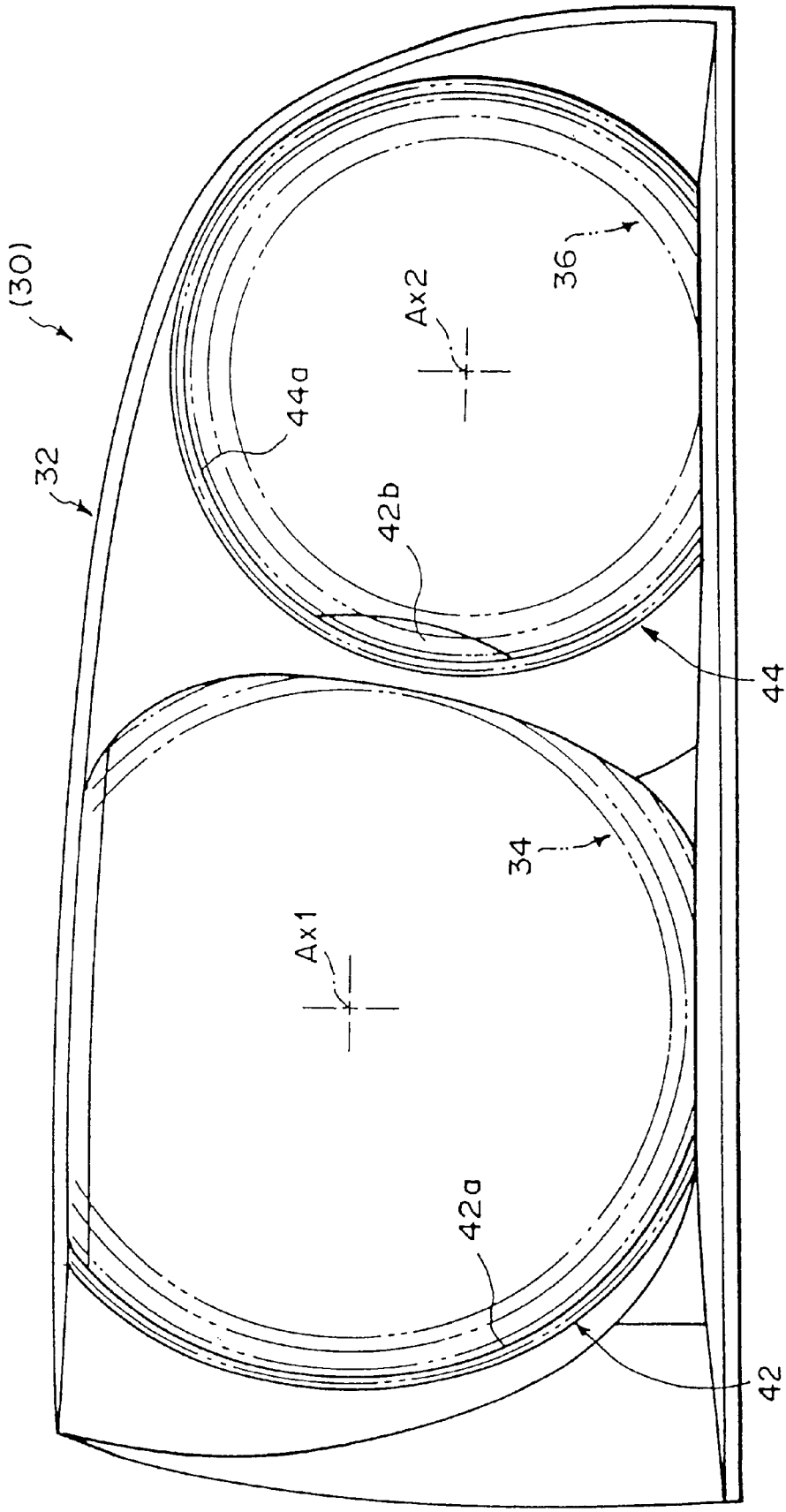
FIG. 7 is a front view of the main body of the extension in accordance with the principles of the invention.
Figure 8:
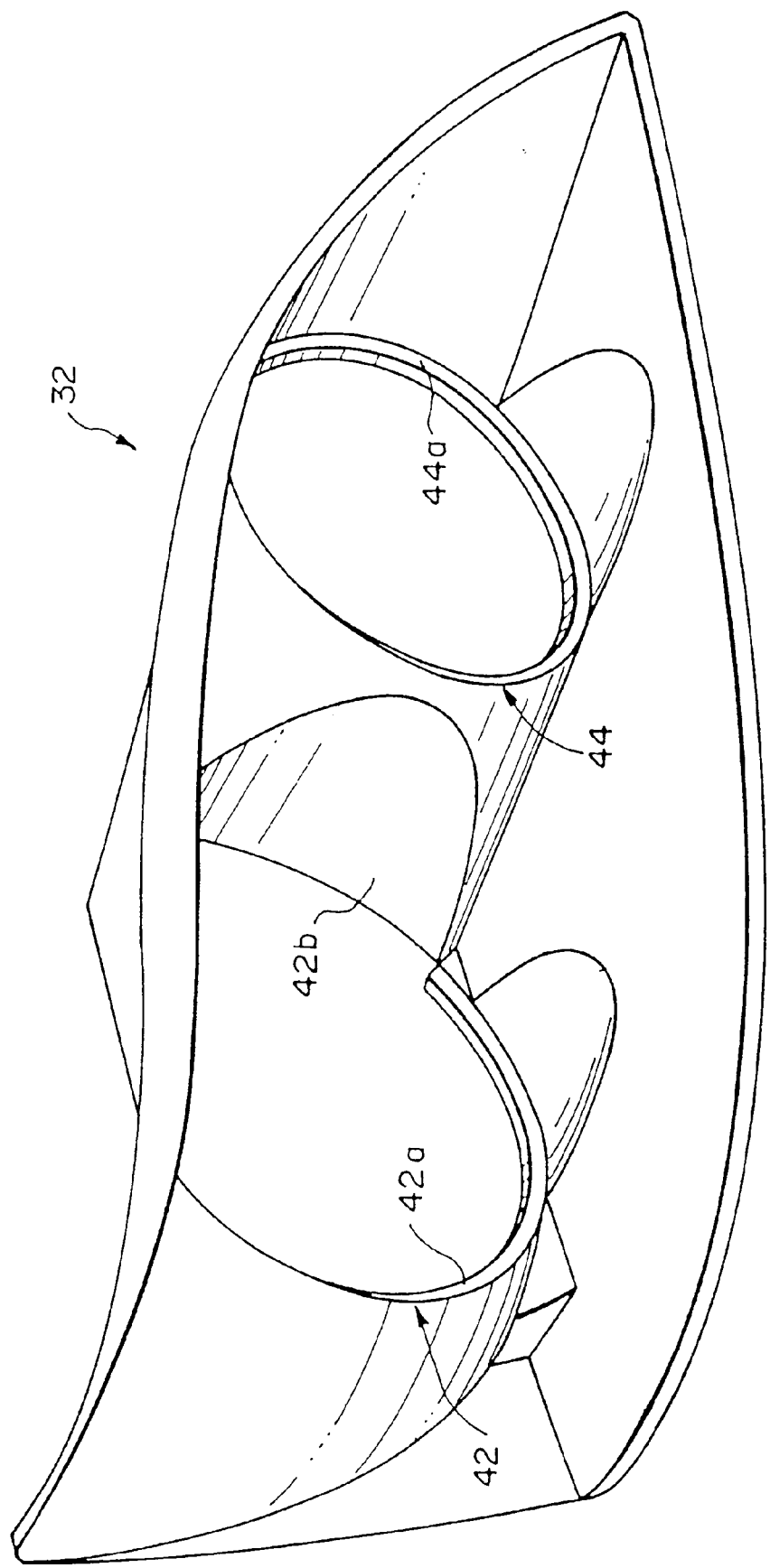
FIG. 8 is a perspective view of the main body of the extension shown in FIG.7.

As shown in FIG. 7 and 8, main body 32 had a surface formed along the lens 12. The main body 32 has a short cylindrical openings 42, 44 formed at positions corresponding to the reflectors 18, 20. Circular arc flanges 42a, 44a are formed at the rear ends of the inner peripheral surfaces of the openings 42, 44. The ring members 34, 36 are secured to the main body 32 so as to be abutted on the corresponding flange 42a, 44a. Note that no flange is formed in the rear end surface of the inner peripheral surface of the wall portion 42b of the opening 42 in the widthwise direction of the vehicle. As shown in FIG. 2, the ring member 34 is abutted on the rear end surface of the wall portion 42b from rearward.

The ring members 34, 36 have substantially V-like cross sectional shapes extending along the circular arc shapes, the center of the which are optical axes Ax1 and Ax2 of the reflectors 18, 20. The ring member 34 is cut at the top end thereof, while the ring member 36 is cut at the lower end thereof. The wall portion 42b of the opening 42 is formed into a conical surface which is displaced inward from the front end to the rear end thereof in the widthwise direction of the vehicle so as to maintain the circular arc shape of the ring member 34.

As shown in FIGS. 2 and 6, the extension 30 is formed to stereoscopically intersect the composite reflector 16 in the hollow portion 40. That is, the extension member 30 is formed such that the wall portion 42b of the main body 32 and a portion of the ring member 34 are introduced into the hollow portion 40.

As described above, the headlamp 10 for a vehicle according to this embodiment incorporates the composite reflector 16 having a pair of right and left reflectors 18, 20 offset in the longitudinal direction. Since the front openings 18a, 20a of the reflectors 18, 20 of the composite reflector 16 are disposed close together in the front view of the headlamp, the connecting portion 38 that is formed into the vertical wall and extends in the substantially longitudinal direction is formed between the two reflectors 18, 20. The connecting portion 38 has a hollow portion 40 formed therein. The extension 30 is disposed in the vicinity of the front of the composite reflector 16 to surround the front openings 18a, 20a of the reflectors 18, 20. Therefore, even if the composite reflector 16 is inclined or otherwise adjusted by the aiming mechanism, interference between the connecting portion 38 of the composite reflector 16 and the extension member 30 can be prevented. As a result, the shape of the extension member 30 can be formed according to the aesthetic requirements of particular headlamp designs as required.

Therefore, according to this embodiment, even if the front openings of a pair of the reflectors that comprise the composite reflector of a headlamp for a vehicle are disposed close together or overlapped with each other, interference between the composite reflector and the extension can be prevented. Thus, the required effective reflecting areas of the reflectors can be maintained. In addition, the degree of design freedom of the headlamp can be improved.

In this embodiment, a decrease in the rigidity of the connecting portion 38 can be prevented or minimized by providing a reinforcing rib 38Aa formed at the upper connecting portion 38A of the connecting portion 38. Rigidity of the connecting portion 38 can also be increased because the corner R is formed for each of the upper and lower corners at the front end of the hollow portion 40 in the connecting portion 38.

The effective reflecting area of the reflector 18 can be easily maintained because the extension member 30 is formed to stereoscopically intersect the composite reflector 16 in the hollow portion 40. As a result, many different designs for the headlamp can be realized.

The extension 30 is formed as a main body 32 and a pair of the ring members 34, 36 joined to the main body 32.

The wall portion 42b can have a conical surface formed in the main body 32. Accordingly, it may be necessary to incline the direction in which the mold for molding the main body 32 is drawn so that the main body 32 can be removed from the mold. For example, a mold for removing the main body 32 as shown in FIG.7 should be inclined toward the outside of the vehicle with respect to the width of the vehicle body. However, the ring members 34, 36 can be formed to be directed in the longitudinal direction, thus improving the design of the headlamp. In addition, varied colors and surface treatments can be applied to the main body 32 and the ring members 34, 36 to create many alternative designs.

With the ring members 34, 36, each opening periphery of the extension member 30 that faces the front opening 18a, 20a can be formed into the circular arc shape even if the curved portion of the front openings 18a, 20a of the reflectors 18, 20 are slightly deformed from the circular arc shapes, as a result, the headlamp design can be improved. Unlike the complicated design of the portion between the reflectors 18 and 20, the present invention allows a well trimmed design of such portion.

It will be apparent to those skilled in the art that various modifications and variations can be made in the vehicle lamp with composite reflector of the present invention without departing from the spirit or scope of the invention. Thus, it is intended that the present invention cover the modifications and variations of this invention provided they come within the scope of the appended claims and their equivalents.

What is claimed is:

1. A headlamp for a vehicle, comprising:
   a composite reflector having a front portion and a rear portion and including a pair of reflectors each having a front opening, being integrally formed with each other, and offset in a longitudinal direction;
   an extension member disposed in the front portion of said reflectors for surrounding said front opening of each of said reflectors, wherein said front openings of said reflectors are disposed adjacent each other as seen in a front view of said headlamp, and
   a connecting portion including a hollow portion formed between said reflectors of said composite reflector housing to penetrate therethrough.

2. The headlamp for a vehicle according to claim 1, wherein a reinforcing rib is formed on said connecting member adjacent said hollow portion of said connecting member.

3. The headlamp for a vehicle according to claim 1, wherein said extension member is disposed to stereoscopically intersect said composite reflector.

4. The headlamp for vehicle according to claim 1, wherein said extension member includes a plurality of opening peripheries facing said front openings of said reflectors, a portion of each opening periphery of said extension member being formed into a circular arc shape, at least in the vicinity of said connecting portion.

5. The headlamp for vehicle according to claim 4, characterized in that said extension member is formed of a main body and a pair of ring members constituting each of said opening periphery.

6. The headlamp for vehicle according to claim 1, further comprising: a light source attached to each of said pair of reflectors.

7. A headlamp for a vehicle, comprising:
 a composite reflector having a front portion and a rear portion and including a pair of reflectors each having a front opening, being integrally formed with each other, and offset in a longitudinal direction;
 an extension member disposed in the front portion of said reflectors for surrounding said front opening of each of said reflectors, wherein said front openings of said reflectors overlap each other as seen in a front view of said headlamp, and
 a connecting portion including a hollow portion formed between said reflectors of said composite reflector housing to penetrate therethrough.

8. The headlamp for a vehicle according to claim 7, wherein a reinforcing rib is formed on said connecting member adjacent said hollow portion of said connecting member.

9. The headlamp for a vehicle according to claim 7, wherein said extension member is disposed to stereoscopically intersect said composite reflector.

10. The headlamp for vehicle according to claim 7, wherein said extension member includes a plurality of opening peripheries facing said front openings of said reflectors, a portion of each opening periphery of said extension member being formed into a circular arc shape, at least in the vicinity of said connecting portion.

11. The headlamp for vehicle according to claim 7, characterized in that said extension member is formed of a main body and a pair of ring members constituting an opening periphery.

12. The headlamp for vehicle according to claim 7, further comprising: a light source attached to each of said pair of reflectors.

* * * * *